2 Sheets--Sheet 1.
BENJAMIN R. HAWLEY
No. 4,848. Brick-Kiln. Reissued April 2, 1872.
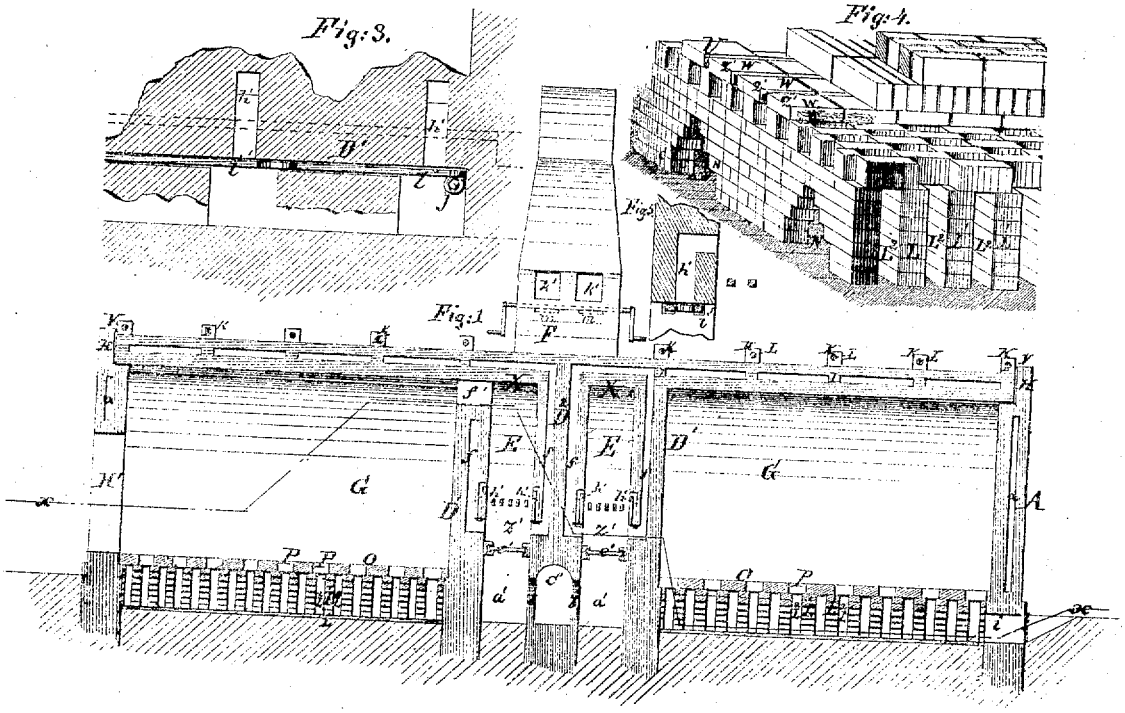
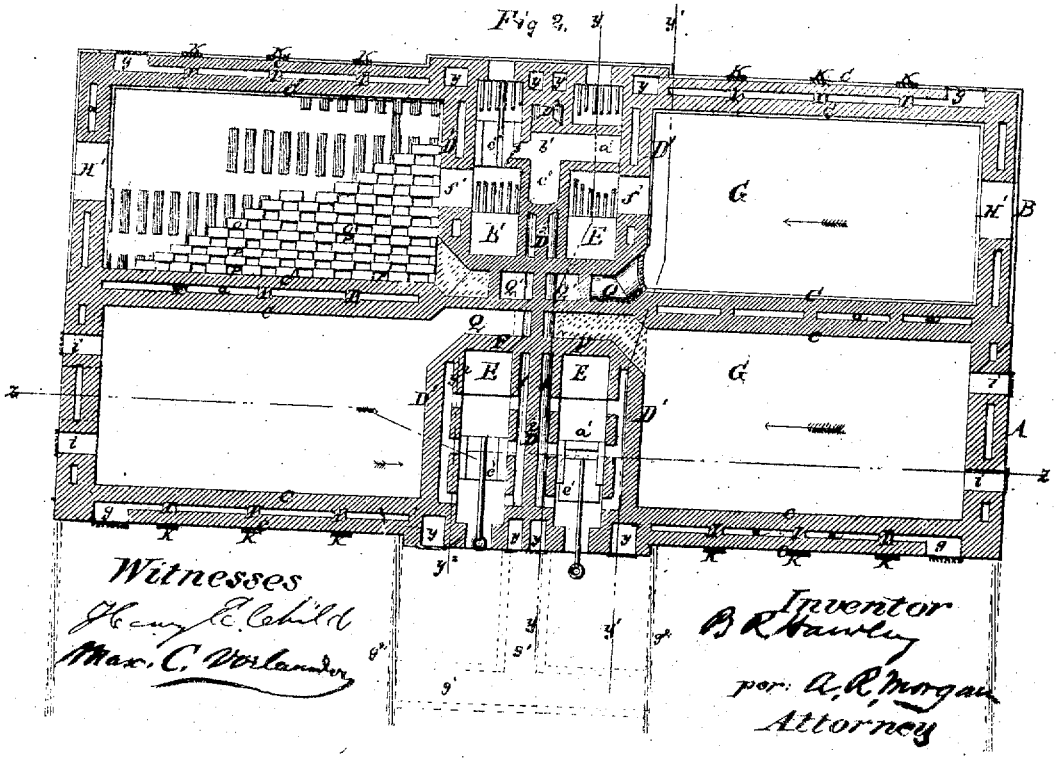
Witnesses
Henry E. Child
Max. C. Vorlander
Inventor
B. R. Hawley
per: A. R. Morgan
Attorney 2 Sheets--Sheet 2
BENJAMIN R. HAWLEY.
Brick-Kiln.
No. 4,848.
Reissued April 2, 1872.
Fig. 6.
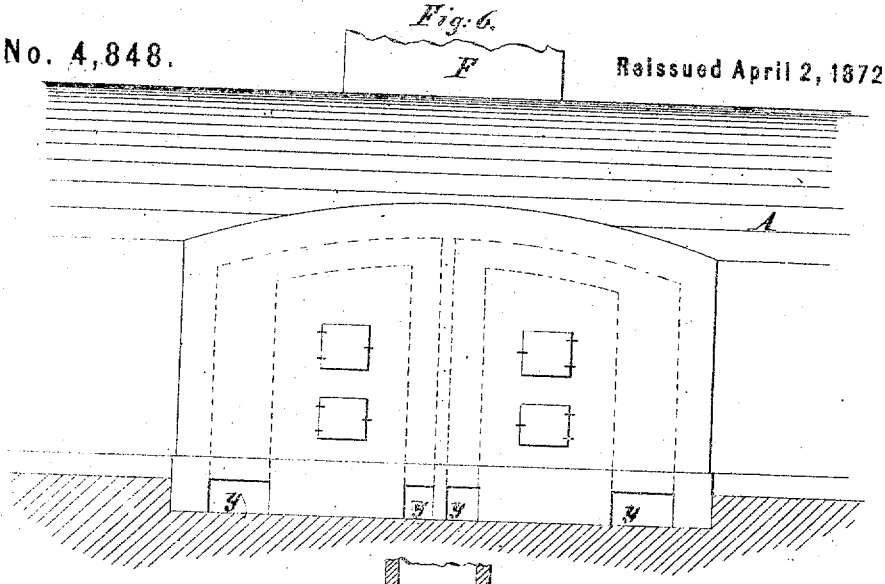
Fig. 7.
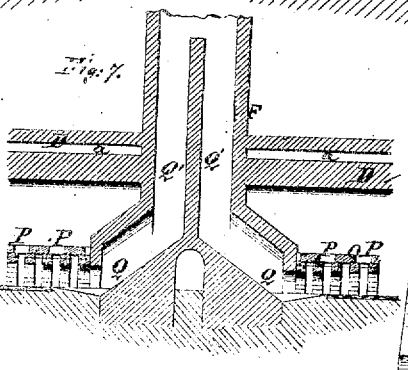
Fig. 8
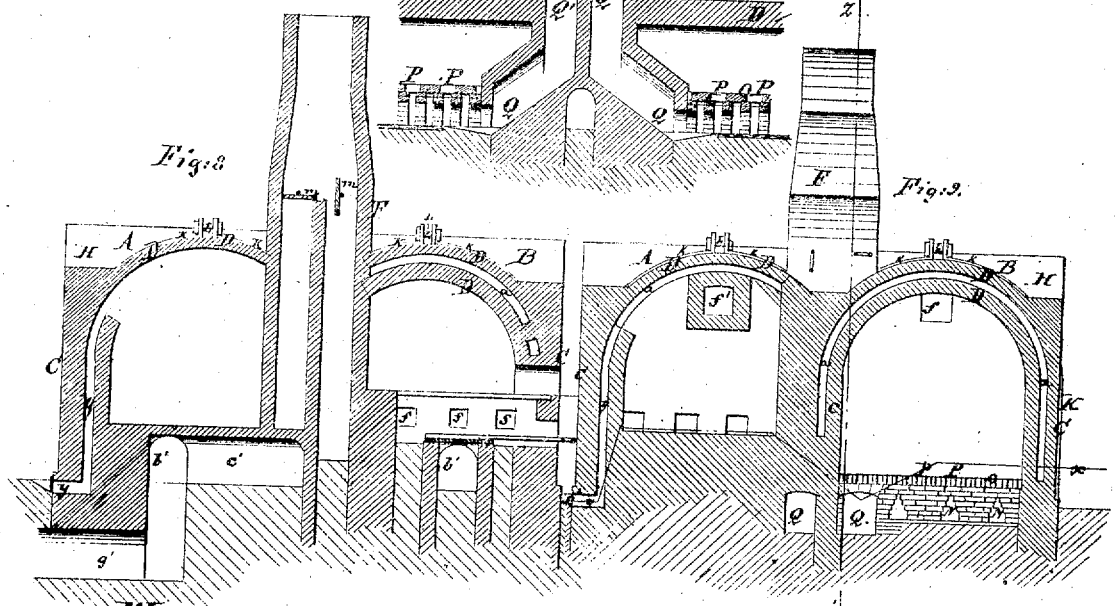
Fig. 9.
Witnesses
Henry E. Ch'ld
Max. C. Wolcander
Inventor
B. R. Hawley
per: A. R. Morgan
Attorney.

BEST AVAILABLE COPY 4,848

UNITED STATES PATENT OFFICE.

BENJAMIN R. HAWLEY, OF NORMAL, ILLINOIS, ASSIGNOR TO ALONZO R. MORGAN, OF NEW YORK CITY.

IMPROVEMENT IN BRICK-KILNS.

Specification forming part of Letters Patent No. 118,364, dated August 22, 1871; reissue No. 4,848, dated April 2, 1872.

Specification describing certain Improvements in Brick-Kilns, invented by BENJAMIN R. HAWLEY, of Normal, in the county of McLean and State of Illinois.

Figure 1 is a longitudinal sectional elevation of my improved kiln, the section being taken on the line $z$ $z$ of Fig. 2. Fig. 2 is a horizontal section partly on line $x$ $x$ of Fig. 1 and partly on line $x'$ $x'$ of Fig. 9. Fig. 3 is a partial transverse section taken on the line $y^2$ $y^2$ of Fig. 2. Fig. 4 is a perspective view of a part of a floor with some bricks upon it, showing the mode of equalizing the application of the heat. Fig. 5 is a detail showing a damper and passages for admitting air above the grate when required. Fig. 6 is a partial side elevation, showing a plan for introducing the air to the furnaces through passages from the bottom to the top, and thence down over the arches of the furnaces to the spaces below the grates. Fig. 7 is a partial longitudinal section of Fig. 9 on the line $z'$ $z'$. Fig. 8 is a transverse section of Fig. 2 on the line $y$ $y$; and Fig. 9 is a transverse section of Fig. 2 on the line $y^1$ $y^1$.

The kiln which is the subject of the improvements hereinafter described is of that class in which the heated air and products of combustion are introduced to the chambers containing the bricks to be burned at the top and caused to flow downward through the bottom, and in which the heat escaping from one compartment in cooling off after the bricks in it are burned is utilized in another compartment for heating the green bricks before the fire is turned on, two or more compartments being arranged in a group for convenience in causing the heat to flow from one furnace to two or more compartments, and in conducting the remaining heat in a burned compartment to another one, to aid, if necessary, in drying the green bricks preparatory to burning. The first part of the present improvements relates to the construction of a kiln comprising two, four, or more compartments grouped in twos or fours, with two or four furnaces and one smoke-stack, by which it is sought to improve the kiln in respect of permanence, simplicity, cost, efficiency, and economy of labor in attendance.

To this end I arrange two long parallel structures, A B, side by side, having vertical side walls, C, rising a short distance from the ground, supporting the true semicircular arches D extending from end to end, and forming the coverings of the said structures. These arched structures are divided near the center by the two transverse walls D', between which space is provided for one or two furnaces, E, in each structure and part of the chimney F, which is built partly in said structures, between the said walls D', as shown in Figs. 1 and 2, and partly between them, as shown in Figs. 8 and 9. Both the vertical walls C and the arched walls D are built double, as indicated by the spaces $a$, the object being to prevent the cracks which may occur in the inner walls from extending through to the atmosphere and allowing the heat to escape or the cold air to draw in rapidly, as it would in some conditions of the draught, and chill the hot bricks adjacent to the cracks. It also provides dead-air spaces, which prevent the escape of heat, and, in the case of the walls between the compartments, which are side by side, it prevents heating through from one to the other, which would interfere with working in the one not burning to put in or remove the bricks while the adjoining compartment is burning. Another object is to enable me to repair the cracks without removing the whole of the wall, for in this arrangement it will only be the inner walls as a general thing that will suffer much damage. The arrangement of the hollow walls and semicircular arches is also desirable, because the walls exposed to the heat and subject to repair and renewal may thereby, as I have demonstrated in practice, be much thinner than when made solid, for the outer walls not exposed to the heat and to damage thereby remain intact and protect the inner ones from the counteraction of the atmosphere on them when heated and cooled; and in the arched form they are best adapted to retain their positions in expanding and contracting or to resist the effect of such action. The inner and outer walls are butted together at suitable distances apart, either by continuous or intermittent connections I, and hoops or bands K anchored down in the ground or in the foundation walls, are stretched over the arches and connected, as at L, by a swivel or other means, by which they may be tightened to prevent undue expansion. Instead of these metal bands I may use vertical posts by the sides of the vertical walls, with tie-rods extending across from one side to the other of the kiln. The said iron bands K pass under the vertical extensions H. The arched tops admit, also, of utilizing the top of the kiln as a drier for drying the sand used extensively in the manufacture of bricks, in molding them, for which I extend the side and end walls vertically as high or thereabout as the tops of the arches, as shown at H, to hold the sand upon the said arches. Thus I not only economize in the cost of sand-drying apparatus, but I utilize the heat that would escape at the top for drying sand. I also save the labor of attendance upon separate drying apparatus for firing.

The second part of my invention consists in a device for preventing the escape of hot air, or the admission of cold air to the interior, at the joints of the end walls with the arches, which are liable to open by the expanding of the insides of the end walls and springing outward of the tops by the heat, which swells the inner sides more than the outer ones, by which they move away from the ends of the side walls, especially at the top. This device consists of a lap-joint formed by a rabbet in one part with the other fitting into it, as shown at *v*, and a filling of loose sand. In the case of the top of the end walls and the arches I arrange it so that this joint opens to the atmosphere vertically, as indicated in Fig. 1, whereby the sand placed on the top to dry will fall into it as it opens and prevent the transmission of air; and it may be allowed to run down to the joints between the vertical parts and keep them closed, also, to a considerable extent. When the walls are cooled down and the end walls spring back again, the sand will be forced from the joints to the interior of the kiln sufficiently to admit of the necessary return of the end walls. This device is more particularly applicable to the joints between the arches only and the end walls.

The third part of the invention relates to the construction of the floors of the kilns, which, for producing the most uniform results in this mode of applying the heat, should be as open as possible throughout the whole area to allow the heated air to settle down and pass off in all parts alike. For this purpose I provide parallel rows of brick walls $L^1$, the thickness of the width of one brick, with spaces $L^2$ between of the same width, and having arches or openings of any kind, N, between them, on which I arrange an open floor of bricks, O, laid alternately, with spaces P, in each direction, of the same size or nearly so as that of the bricks. In practice, the bricks will lap each other slightly, as indicated in Fig. 2, to prevent shifting about. The arched walls $L^1$ are preferably arranged parallel with the longest diameter of the furnaces, and the passages formed by the arches perpendicular to them; but this is not essential. Either way provides free passage below the floor for air to find its way from all parts to the escape-passage Q into the smoke-stack F.

It will be seen that this arrangement of the floor facilitates the application of the heat equally to the bricks set upon it in the lower part. The distribution of the heat in the compartments is effected mainly by the tendency of the heated air admitted at the top to spread laterally when prevented from escaping upward, which is its natural course; but in practice it is found to deviate somewhat from this tendency to spread, especially when exhausted from the bottom of the compartment by a strong draught, the said deviation being caused by the tendency of the heated air when the kiln is filled with green material to favor the most direct course from the passage *f'*, where it enters from the furnace, to the bottom along the wall D', or thereabout, and to the escape-passage Q, so that the bricks near the outer end wall of the compartment will not be burned in the same measure as those in the other part. While this tendency may be modified somewhat by limiting the draught, by closing the dampers therefor, it cannot be completely overcome thereby, and at the same time maintain sufficient draught to meet the requirements for proper combustion and the requisite degree of heat, especially if the compartments have considerable length in this direction. I have therefore devised the following arrangement to counteract this tendency, which said arrangement constitutes the fourth part of the invention: I lay the lower tier of bricks *z'* flatwise, as shown at V in Fig. 4, in continuous rows, end to end, parallel with the walls D', but with a narrow space between each row, and for about two-thirds, more or less, of the distance from the walls D' to the end walls of the compartments. I pack each space with a narrow strip, W, of wood, like the laths used in plastering—or it may be any other combustible material—for stopping the draught temporarily through the spaces above, and compelling the heated air to flow to the outer ends of the compartments during the first part of the burning, and until the green bricks having the lath-strips between them become sufficiently heated to set the strips on fire and burn them out, after which the heat, descending through the formerly obstructed part, will do its work therein, and at the part most distant from the side where it enters and escapes alike. When the said most distant part has been heated up in this way, the draught will continue through it after the wood strips have been burned out for a considerable time, because of the greater heat thereat, to which the inflowing heat naturally tends. The distribution of the heat in this way may be regulated to any practical requirement by varying the distance of the rows of bricks apart and the size of the strips.

The fifth part of the invention consists in

BEST AVAILABLE COPY devices for introducing into the kiln a current of external air, for the purpose of protecting the furnace-arches from the action of the intense heat and to furnish heated air for combustion. This air from without is admitted to the tops of the arches X, through passages or flues beginning at the bottom of the kilns—the furnaces being closed thereat for preventing the escape of heat through the supply-passages—which occurs when they are located above the arches, as heretofore, and the air is admitted through the top—when the furnaces are opened for supplying fuel. For this purpose I provide passages or flues *y*, by any suitable construction of the walls leading from the ground on a level with or below the furnace-doors up to the arches X over the furnaces, for the air to pass over and cool them, and to convey the heat taken from them to the fire. From the spaces above the walls X the air passes down to the ash-pits $z^2$, through the passages *f*. Instead of employing the flues *y* for thus admitting the air, I may provide openings *g* through the outer walls of the kiln, admitting the cold air to the spaces *a*, between the outer and inner walls, to flow thence up over the arches X to the spaces X over the furnaces, if preferred, to protect the inner walls of the brick compartments from the heat, and to heat the air more before entering the fire; but in this case the inner walls should be free from cracks, which would admit the air directly to the compartments containing the bricks, by which they would be injured.

Heretofore the air has been admitted to the arches X over the furnaces, through passages at the top of the kiln, as above stated. This is very objectionable in practice, for, as before intimated, when the furnace-doors are opened so that the cold air flows in thereat the draught turns backward through the passages *f*, and the heat escapes through said openings and is lost. The openings *i* are for admitting the cold air into the bottom of a compartment for cooling off after burning.

The sixth part of the invention consists of a connection of all the furnaces of a group by chambers and passages below with controlling dampers, whereby a most simple and efficient means are provided, in connection with the air-passages from the furnaces to the compartments, and the passages for admitting air to the compartments for cooling them, by which the remaining heat in a burned compartment may be caused to flow into any other compartment in the group for utilizing it to dry and heat the green bricks as much as it will, before turning on the heat of the furnaces, or into the fires for feeding them with heated air, all of which is accomplished with the chambers $a'$ under the ash-pits $z^2$, connected by the passages $b'$ and $c'$ with controlling-dampers $e'$, the said passages $b'$ connecting the two furnaces of one side, and the passage $c'$ connecting those of both sides.

The mode of burning the bricks and thus utilizing the remaining heat is as follows: One of the compartments, G, being charged—through an opening, H′, with which each is provided for the purpose, and which is temporarily walled up while burning—a fire is started in a furnace adjacent to it, and the heat passes into it through the passage $f'$, thence down between the bricks through the compartment containing them, and the floor, and through the passages under the floor, to the passage Q, escaping into the chimney, which is divided vertically for a suitable distance into as many flues Q′ as there are passages Q entering it, each flue being controlled by its appropriate damper *m* for preventing the draft from one compartment from interfering with that of another. The damper $e'$, under the burning-furnace, is kept closed while this operation is going on; but when the bricks have become sufficiently burned, and it is necessary to cool them off, the heat is conveyed from the burned compartment back through its passage $f'$ and furnace, down through chambers $a'$ and passage $b'$, up through the other furnace and its passage $f'$, into the adjoining compartment containing green bricks, when the next one to be burned is on the same side of the chimney or in the same structure A or B that the last one burned is; but if on the other side of the chimney, the heat is conveyed along the passage $c'$, under or around the chimney to the opposite side, and up through the furnace in the same way. For accomplishing this the damper *m* in the passage Q′ of the chamber to be burned is opened; the damper *m* of the passage Q′ of the chamber to be cooled is closed; the dampers of passages *y* are closed; the passages *i* of the compartment to be cooled are opened; the dampers $e'$ of the furnaces, through which the air from the compartment to be cooled must pass, are opened; the other dampers $e'$ are closed, and the passages *i* of the compartment to be burned are closed. When the compartment having the green bricks has thus been heated up equal to that of the one cooling off, so that it cannot be further heated thereby, the remaining heat in the cooling compartment will be utilized for feeding the fire, which will then be started in the furnace of the compartment thus partially heated and fed with heated air from the compartment cooling off as long as any heat remains in it; whereby all the heat of a burned compartment, lost heretofore, will now be economized. After this remaining heat is all used the air for the support of combustion will be supplied to the furnace through the passages *y* in the regular way, and the draught through the cooled compartment will be stopped. It will thus be seen that the operation of the kiln, so far as the shifting of the flow of cold and heated air is concerned, for burning and cooling off, is controlled by the dampers of passages Q′, *y*, *i*, and $a'$, all of which, excepting Q′ in the chimney, are at the bottom of the kiln, where they can be reached most readily; and what is much more important, and one of the essential objects of the arrangement is, they are all so arranged as not to be subject to any material degree of heat, and are therefore not subject to much injury by it; consequently they may be made of light and cheap material and will not have to be replaced as often as when arranged where they are more exposed to heat. An under-ground passage, $g'$, is arranged in connection with the chambers $a'$ and passages $b'$ $c'$ for conducting the heat, when required, to dry-houses, (see Fig. 2,) through which the heat will be caused to flow by having all the dampers $e'$ closed, except the one admitting heat to it. Openings $k'$, giving access to dampers $m$ for repairs, may be placed in the chimney above the kiln, but they are not essential.

The seventh part of the invention relates to an arrangement of passages and dampers for admitting a large amount of air to the furnaces above the grate when fresh fuel is added, to supply adequate quantities of oxygen at such times when the gases are liberated from the coal in greater quantities than after burning a short time, when the air may be shut off again gradually as the liberation of the gases subsides. For thus admitting the air, passages $h'$ are provided in the walls $D^1$ $D^2$, leading from the mouths of the passages $f$ upward and into the furnaces E, as clearly indicated in Fig. 1, the point of discharging into the furnaces being about as high or a little higher above the grates than the top of the fuel when charged, and the sliding-dampers $i'$ are suitably arranged in connection for closing and opening them; said dampers may be reached by a hooked rod presented through the door of the furnace and engaging an eye $j'$, or they may have a rod extending through the wall to the front. In the drawing, the passages $h'$ extend from the mouth of the passages $f$, below the grates, upward to the furnaces, which has been thought desirable in some cases to prevent the reaction of the draught up through passages $f$, when the furnace doors are opened to supply fuel, but said passages may be made directly through the walls to passages $f$, horizontally above the fire, and will operate as well generally. In some cases it may be found advantageous to place the smoke-stack, or at least the principal part of the vertical portion thereof, in some other position than the one here indicated—that is, at the center between the two structures, A B; for example: In building very extensive works requiring eight of the burning compartments, which would require duplicate structures A B, they might be placed end to end with a space between, and the smoke-stack built therein with underground flues extending from the center, where the stack now stands, to a larger one between the structures, for accommodating the whole; or the said duplicate structures might be placed side by side, with a space between them for the smoke-stack, with flues passing under one-half of each of said structures to it; and other modifications of this character may be employed, while the principle of the arrangement would not be changed or affected in any way, for the entering point of the heated air and gases to the flue would be at the same place, except that in one case on entering the chimney the passage would be directly upward, while in the other it would be downward for a short distance, and then in a lateral direction to the stack, where they would finally escape upward. I therefore consider any arrangement of this kind but the equivalent or obvious modification of what I have here represented in the drawing, and propose to avail myself of any such modification, as circumstances may require.

I claim as my invention—

1. The combination of the two parallel arched structures A B, four furnaces E, and the stack F, all constructed and arranged as and for the purpose herein described.

2. The arrangement of the rabbet-joint, connecting the roof and sides of the kiln with the superimposed charge of sand, as and for the purpose described.

3. The arrangement of the open floor, composed of bricks O, supported on arched walls L, the said bricks and walls being arranged with the alternate intervening spaces, as and for the purpose set forth.

4. The arrangement of the open floor $o$, superimposed course of bricks, and combustible filling W, as and for the purpose set forth.

5. The arrangement in the adjoining furnaces and burning-compartments communicating by passages $f$, as described, of passages with appropriate dampers, connecting the furnaces at the bottom, and passages $i$, also with dampers opening from the exterior into the compartments, substantially as specified.

6. The combination of grouped furnaces E, passages $a'$, $b'$, and $c'$, and their controlling-dampers, in the manner and for the purposes set forth.

7. The arrangement of air passages $y$, $f$, and $h'$, as herein shown and described, for the purpose of admitting hot air to the furnaces above the grates, substantially as and for the purpose set forth.

The above specification of my invention of improvements in brick-kilns signed by me this 1st day of January, 1872.

B. R. HAWLEY.

In presence of—
S. W. SQUIRES,
A. F. DICKINSON.